Apr. 17, 1923.

G. SLIDER

MECHANICAL MOVEMENT

Filed Sept. 27, 1921

1,452,221

Inventor
George Slider

By John W. Dooley,
Attorney

Patented Apr. 17, 1923.

1,452,221

UNITED STATES PATENT OFFICE.

GEORGE SLIDER, OF BALTIMORE, MARYLAND.

MECHANICAL MOVEMENT.

Application filed September 27, 1921. Serial No. 503,563.

*To all whom it may concern:*

Be it known that I, GEORGE SLIDER, a citizen of the United States, residing at Baltimore, in the State of Maryland, have invented certain new and useful Improvements in Mechanical Movements; and I do hereby declare the following to be a full, clear, and exact description of the invention, such as will enable others skilled in the art to which it appertains to make and use the same.

My invention relates to mechanical movements.

It has among its objects:

The production of a movement including two parallel shafts for driving certain mechanisms as, for instance, a clothes washer and a clothes wringer, and a third shaft for casual connection to different mechanisms, the three shafts being driven by a source of power through the medium of a member that is arranged to slip if more than a predetermined power is being transmitted, so that fracture of the parts of the driven mechanisms and serious injury to the operators thereof is avoided.

These and further objects of my invention will be set forth in the specification and illustrated in the drawings and the means by which said objects are effectuated will be definitely pointed out in the claims.

Figure 1:
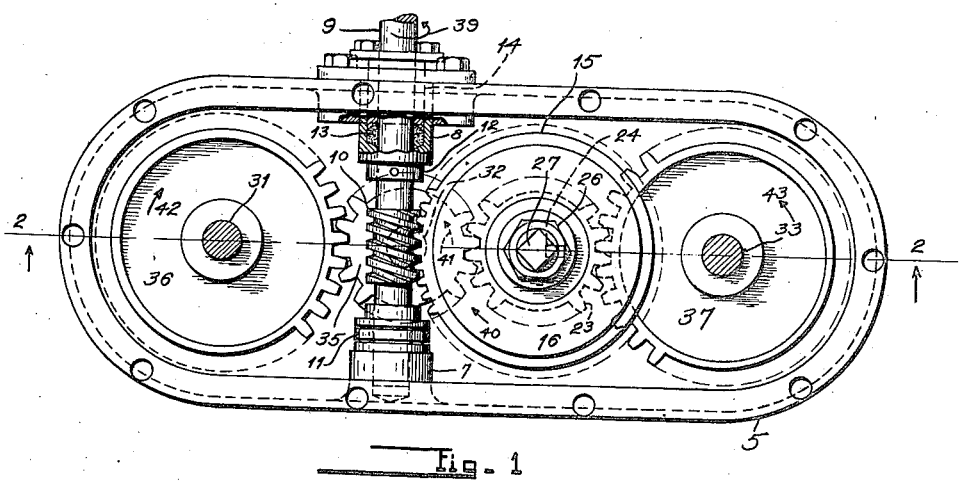
Figure 1 is a plan view of my movement, the cover of the gear casing being removed to show the operating parts.
Figure 2:
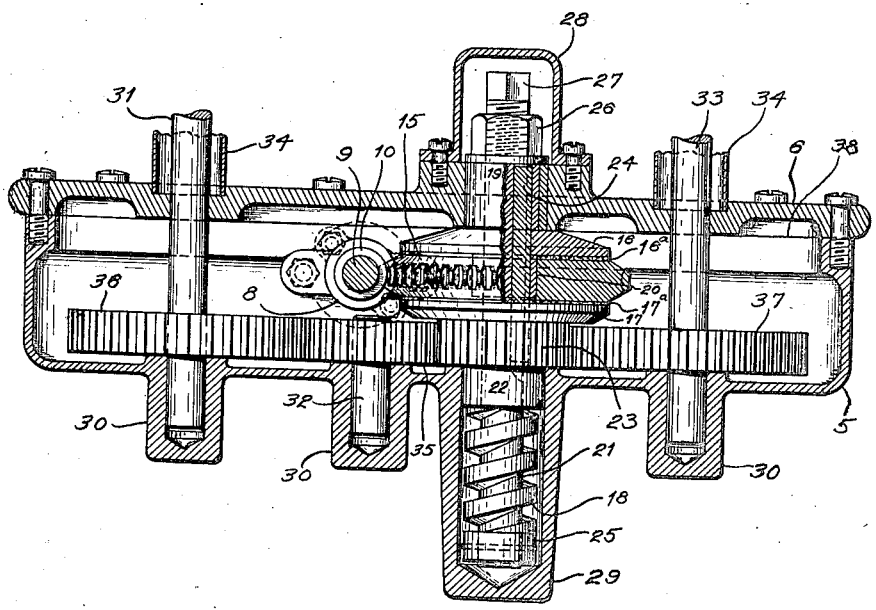
Fig. 2 is a section along the line 2—2 in Fig. 1, looking in the direction of the arrow.

5 is a gear casing provided with a cover 6 secured thereto.

Bearings 7 and 8 are provided in the casing 5 for the power shaft 9. A worm 10 is formed integrally with or mounted upon the shaft 9 and a roller bearing 11 supports the thrust of said worm. The collar 12 secured to the shaft 9 prevents end play thereof, and packing 13 compressed by the sleeve 14 prevents egress of oil around said shaft.

The worm 10 meshes with the worm wheel 15 which is clamped between the clamping discs 16 and 17 by the spring 18. Fibre or other suitable washers 16ª and 17ª are interposed between said discs and wheel. The disc 16 is provided with a bearing portion 19 that is revolubly mounted in a bearing provided in the cover 6, and with a bearing portion 20 on which the wheel 15 is revolubly mounted. The disc 16 and portions 19 and 20 are preferably formed integrally and have a central cylindrical hole in which is slidably mounted the shaft 21.

The disc 17 is provided with a bearing portion 22 that is revolubly mounted in a bearing provided in the casing 5, and with a spur gear 23. The disc 17, portion 22 and gear 23 are preferably formed integrally and have a central cylindrical hole in which is slidably mounted the shaft 21.

A spline 24 is secured in the shaft 21 and keyways slidably fitting said spline are formed in the discs 16 and 17 and the parts formed integrally therewith.

The spring 18 is compressed between the collar 25 secured to the lower end of the shaft 21 and the bearing portion 22 by means of the nut 26 threaded upon the upper end of said shaft and having its lower face bearing against the upper face of the portion 19.

By this construction the discs 16 and 17 positively drive the shaft 21 and the gear 23, but said discs have only frictional driven connection with the gear 15. A squared portion 27 is provided upon the upper end of the shaft 21 for the reception of the socket of a flexible or other shaft for driving various mechanisms. The end 27 is covered by the cap 28 when not in use. A boss 29 having a well for the reception of the portion 22, spring 18, collar 25 and shaft 21 is formed on the lower side of the casing 5.

Three bosses 30 are formed upon the bottom of the casing 5 and in each of said bosses are formed bearings in which are revolubly mounted the ends of the shafts 31, 32 and 33. Bearings for the shafts 31 and 33 are also provided in the cover 6 and said shafts may be shielded by tubes 34—34 if desired. The upper ends of the shafts 31 and 33 may be used to drive any suitable mechanisms as, for instance, a clothes washer and clothes wringer, respectively.

The idler spur gear 35, fast on the shaft 32, is driven by the gear 23 and drives the gear 36 fast on the shaft 31.

The gear 23 drives the gear 37 which is fast on the shaft 33.

The casing 5 is to be filled with grease or oil to nearly the plane of the top thereof at 38. It is to be noted that parts requiring lubrication are placed below said plane in order to avoid leakage of the lubricant.

The operation of my improved mechanism is as follows:—

Power is to be applied to the shaft 9 to rotate it in the direction of the arrow 39. This will rotate the wheel 15 and shaft 21 in the direction of the arrow 40 and the wheels 35, 36 and 37 in the directions of the arrows 41, 42 and 43, respectively. Should the rotation of either of the shafts 21, 31 or 33 meet with undue resistance, said shafts will stop and the shaft 9 will continue to rotate, the wheel 15 slipping between the washers 16$^a$ and 17$^a$.

Thus it will be seen that I provide a simple, cheap, effective and safe mechanism useful in driving many mechanisms in the household.

I claim:—

1. In a mechanical movement, the combination with a casing comprising a bearing, and a cover for said casing comprising a bearing, of a disc having a bearing portion revolubly mounted in the bearing in said casing, a second disc having a bearing portion revolubly mounted in the bearing in said cover and comprising a second bearing portion, a worm wheel revolubly mounted on said second bearing portion between said discs, said discs and bearing portions comprising aligned holes having keyways, a pressure shaft having a key and slidably mounted in said holes, a nut on said shaft bearing against said second named bearing portion and a spring on said shaft bearing against said first named bearing portion and pressing said nut against said first named bearing portion, whereby said spring presses both said discs against said worm wheel.

2. In a mechanical movement, the combination with a casing comprising a bearing and a cover for said casing comprising a bearing, of a disc having a bearing portion revolubly mounted in the bearing in said casing, a second disc having a bearing portion revolubly mounted in the bearing in said cover and comprising a second bearing portion, a worm wheel revolubly mounted on said second bearing portion between said discs, said discs and bearing portions comprising aligned holes having keyways, a pressure shaft having a key and slidably mounted in said holes, a nut on said shaft bearing against said second named bearing portion, a spring on said shaft bearing against said first bearing portion and pressing said nut against said first named bearing portion, whereby said spring presses both said discs against said worm wheel, and a gear on one of said discs.

3. In a mechanical movement, the combination with a pair of discs, each comprising a bearing portion for revolubly supporting said disc and a second bearing portion on one of said discs, of a gear wheel revolubly mounted on said second bearing portion, means for pressing said discs against said gear, and a gear driven by said discs.

4. In a mechanical movement, the combination with a pair of discs, each comprising a bearing portion for revolubly supporting said disc and a second bearing portion on one of said discs, of a gear wheel revolubly mounted on said second bearing portion, means for pressing said discs against said gear, a gear driven by said discs and means for preventing relative angular movement of said discs.

In testimony whereof, I affix my signature.

GEORGE SLIDER.